July 7, 1953
F. S. AVIL
2,644,661
MACHINE FOR WEIGHING AND PACKAGING
POTATO CHIPS OR THE LIKE
Filed Feb. 16, 1948
4 Sheets-Sheet 1
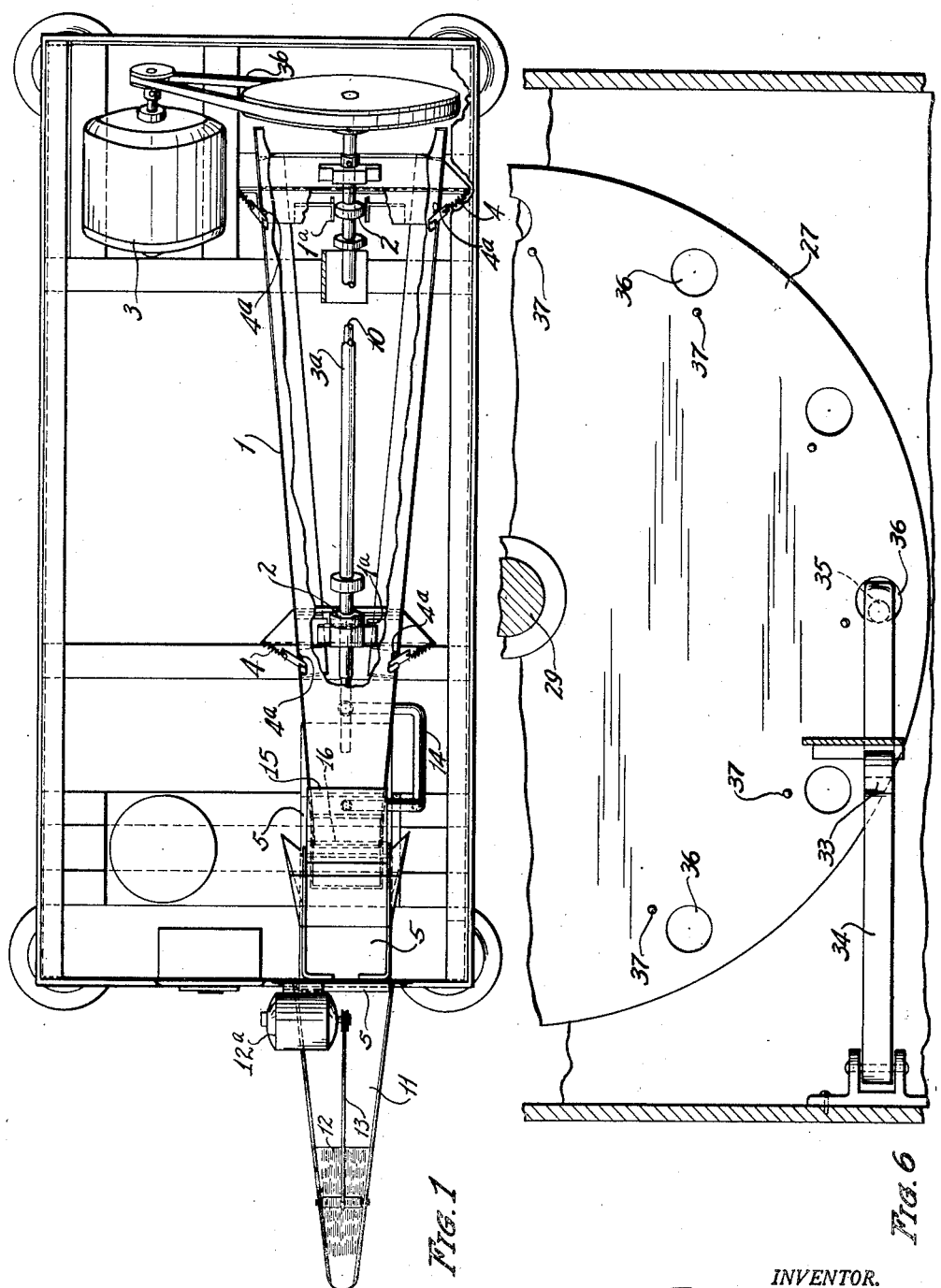
INVENTOR.
FRANK S. AVIL.
BY
Milburn & Milburn
ATTORNEYS.

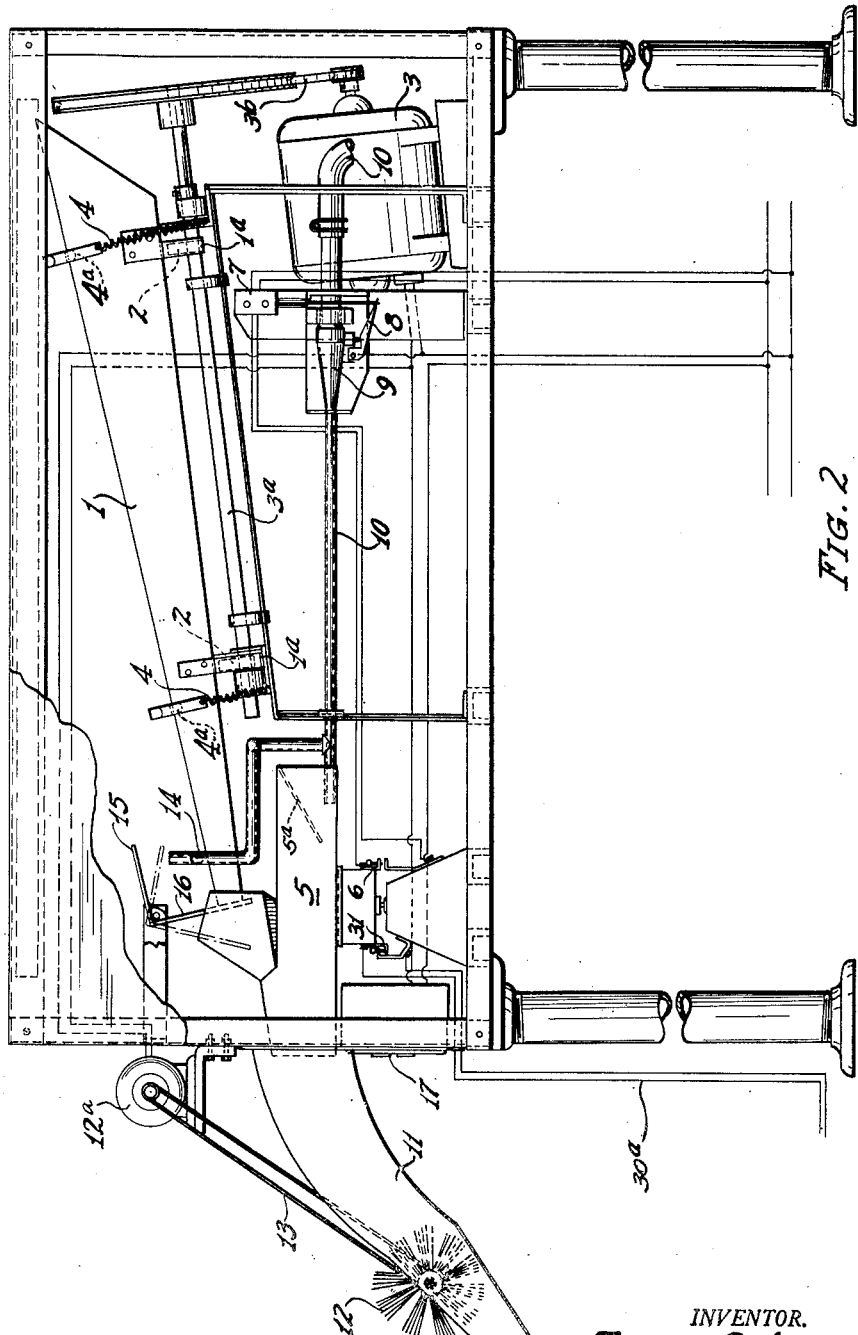

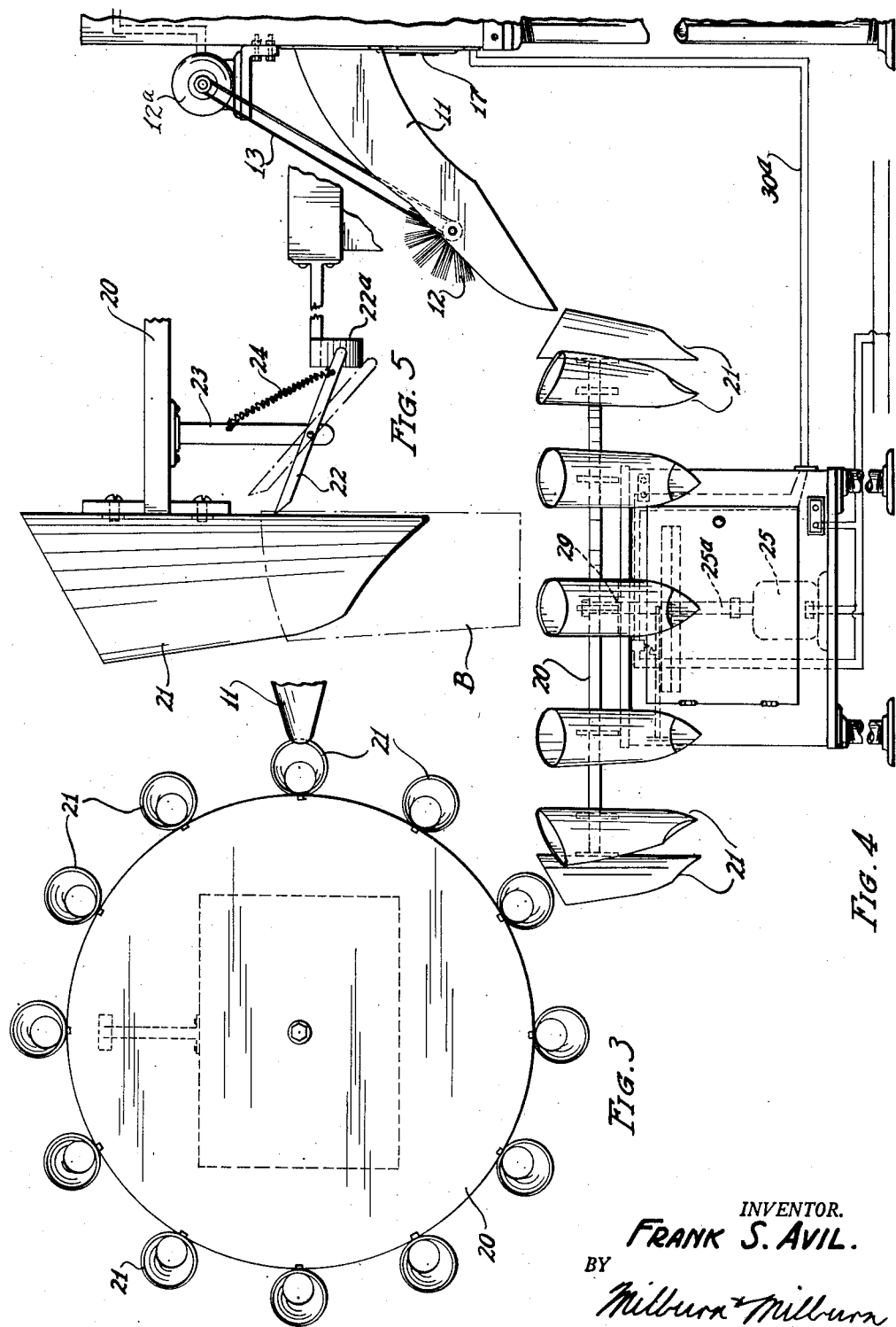

July 7, 1953

F. S. AVIL 2,644,661

MACHINE FOR WEIGHING AND PACKAGING
POTATO CHIPS OR THE LIKE

Filed Feb. 16, 1948

INVENTOR.
FRANK S. AVIL.
BY
Milburn & Milburn
ATTORNEYS.

UNITED STATES PATENT OFFICE 2,644,661

MACHINE FOR WEIGHING AND PACKAGING POTATO CHIPS OR THE LIKE

Frank S. Avil, Avondale Estates, Ga.

Application February 16, 1948, Serial No. 8,659

2 Claims. (Cl. 249—2)

This invention relates to an improved device for weighing predetermined quantities of a commodity and transferring the same to a succession of containers for delivery in packaged form to the trade, as for instance potato chips.

One object of my present invention is to devise a convenient and efficient means for weighing a predetermined quantity of potato chips or the like and then automatically discontinuing the supply of the commodity and transferring the weighed portion to a container for delivery to the trade.

Another object is to devise such an apparatus for filling containers with a predetermined weight of such a commodity, in which an air-jet means may be employed for transferring the commodity from the weighing receptacle to the container in each instance.

Another object is to provide a unitary assembly in which the potato chips or the like may be weighed into individual predetermined quantities and filled into individual containers which are supplied to filling position, these two operations being performed in properly timed relation to each other.

Another object is to devise such an apparatus with means for preventing operation of the container-positioning means while a container is being filled from the weighing receptacle.

Other objects will appear from the following description and claims when considered together with the accompanying drawings.

Fig. 1 is a top plan view of the weighing and discharging part of the present device, with a part broken away;

Fig. 2 is an elevation of the structure shown in Fig. 1 and with part of the housing broken away;

Fig. 3 is a top plan view of the turn-table upon which the containers are mounted for presentation to the weighing and discharging part of the present device;

Fig. 4 is an elevation of the turn-table for the containers, with a general showing of the means for operating the turn-table and also in association with the means for discharging the weighed unit of the commodity from the weighing part of the present device;

Fig. 5 illustrates in elevation the means for removably holding a bag upon one of the bag-holding devices of the turn-table, and also the means for automatically releasing the filled bag therefrom;

Fig. 6 is a partial top plan view of the detent latch means for preventing transmission of power to the turn-table while a bag is being filled from the weighing part of the present device.

Figure 7:
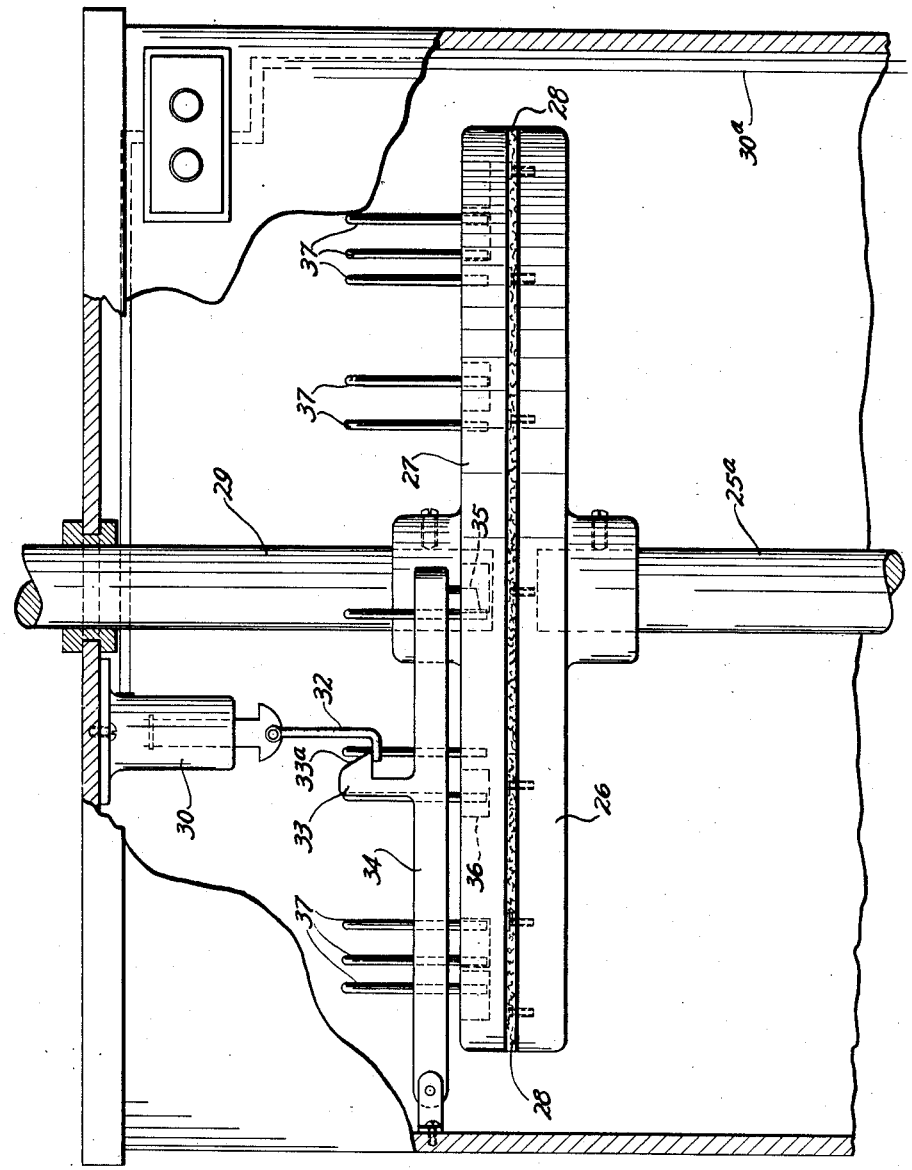
Fig. 7 is an enlarged detail view of the mechanism for controlling the operation of the turn-table, this view including the slip clutch and corresponding to a part of Fig. 4 hereof.

It is to be understood that the present form of disclosure is merely for the purpose of illustration and that there might be devised various modifications thereof without departing from the spirit of my invention as herein set forth and claimed.

In the present disclosure it is assumed that this device is to be employed in connection with potato chips although it is to be understood that it may be employed in the handling of other commodities also, my present form of device being particularly adapted for the weighing and packaging of potato chips or other commodities of like character.

Referring now to the accompanying drawings in detail, the potato chips may be supplied through the top of the frame or housing structure in any suitable manner, as for instance an automatic conveyor, to the shaking hopper I which has its bottom inclined downwardly towards its discharge end. This hopper is so mounted that it may be given a suitable shaking motion by means of cams 2 which are mounted upon the rotatable shaft 3a and which have operative engagement with the companion yoke means 1a extending downwardly from the hopper I. There is a spring means consisting of pairs of clips 4a which engage angularly over the upper edges of the hopper I and which are normally exerted downwardly by the coil springs 4 so as to prevent the hopper I from riding up out of assembly during operation of the cams. The shaft 3a is driven from the electric motor 3 through belt 3b. This motion is sufficient to shake the potato chips down into the balance or weighing hopper 5 which has an open discharge end and which serves as the receptacle of a weighing scale; this arrangement being such that, when hopper 5 has received a predetermined weight of the potato chips or the like, the resulting downward motion of hopper 5 will cause the electric contact 6 to close so as to automatically energize solenoid 7 which is included in the same electric circuit with contact 6. Energization of solenoid 7 and upward movement of its core serves to rock lever 8 which is thereby caused to engage the stem of an air valve 9 so as to open compressed air line 10. Compressed air may be supplied from any suitable source not here shown. Air pipe 10 extends into the rear end of hopper 5, which may be entirely open or at least sufficiently open to permit operation of hopper 5 as part of the weighing scale, and terminates therewithin to the rear of the downwardly and forwardly extending chute 5a which terminates above the bottom of the hopper 5 and which facilitates the discharge of the potato chips entirely from the hopper by the jet of air out through the open discharge end thereof and into the downwardly inclined snout 11.

The snout 11 is of such inclination that the potato chips will fall by gravity therealong and this discharging motion may be promoted still further by a rotary brush 12 which is mounted in the lower end of the snout 11 and which is operated by electric motor 12a through the belt 13. Motor 12a is in the same electric circuit with motor 3. At the same time that air valve 9 is opened for discharging the potato chips from hopper 5, the same supply of compressed air may be utilized through an auxiliary pipe 14 for impinging against the vane 15 which constitutes one arm of a lever, the other arm of which may be in the form of a shutter 16 for effective closing engagement across the discharge end of hopper 1. Thus the supply of potato chips to hopper 5 will be temporarily discontinued so as to ensure an accurate and full weight of the potato chips being delivered from the balance hopper 5. When, however, the balance hopper 5 has been emptied of its potato chips, which may be effected practically instantaneously by the jet of air, the automatic upward return of the balance hopper 5, now emptied, will cause the electric contact 6 to open and to thereby permit the air valve to return automatically to closed position, and thereby permitting the shutter 16 to swing automatically to open position. The parts are then in position for repetition of the above sequence of operations for weighing and discharging another predetermined quantity of potato chips. The motor 3 may run continuously during these operations, but there will be provided suitable and conveniently located electric switches, as for instance at the point 17, for control of the electric system through necessary wiring.

The predetermined weight of potato chips, upon being discharged from the end of the snout 11, are received into one of a series of bags B which may be mounted by the operator upon a rotatable turn-table 20 which will position the bags in properly timed succession at the proper point with respect to the snout 11. The turn-table 20 has mounted thereupon at equal intervals circumferentially thereabout a plurality of bag-holders 21, which are each of tapering form and have a slanted enlarged open end at the top and a smaller open bottom end that is slanted in the opposite direction from that of the top end thereof. The lower end portion of the bag-holder 21, in each instance, is adapted to receive the open end of a bag B thereabout and each bag-holder 21 is provided with means for removably holding the bag B in such position for the bag-filling operation.

This bag-holding means comprises a bag catch 22 which is pivotally mounted intermediate its ends upon a post 23 depending from the underside of the turn-table 20. The coil spring 24 normally tends to force the pointed end of the bag catch 22 into engagement with the holder 21. By placing the open end of a bag B up about the tapering lower end of the bag-holder tube 21 and past the point of the resiliently-acting catch 22, the bag may be brought into position of effective engagement by the catch 22 so as to be held in such position thereby. When once a bag B has been placed in such position, any tendency to lower the bag upon the tube 21, will force the point of the catch 22 into even more effective engagement with the bag B and against the bag-holder tube 21. However, when the bag has been filled, it may be readily removed from its holder 21 by depressing the outer end of the catch 22; and I have provided a stationary cam means 22a which is so located as to be adapted for engagement by the rear end of each catch 22 in the rotary path of travel of the same with the turn-table 20 and which is adapted thereby to effect sufficient depression of the catch 22 for releasing automatically the filled bag B and permitting the same to fall of itself by gravity from the bag-holder tube 21.

Thus, with my present device, it is merely necessary for the attendant to position himself at one side of the turn-table 20 and to place empty bags B one at a time upon each of the bag-holders 21 as they present themselves in their rotary path of movement. The filled bags may be removed from the turn-table at a point upon the other side of the filling position.

The turn-table 20 is mounted upon the vertical rotatable shaft 29 which is driven by the electric motor 25 through an automatically controlled slip clutch in order that the turn-table may be operated at proper intervals for positioning the succession of bags for the filling operation of each individual bag B and for moving the filled bags one by one to the position for removal of the same in the manner above explained.

This slip clutch comprises the disk or plate 26, which is affixed to the rotatable shaft 25a of the motor 25, and the companion disk or plate 27. Between these two disks 26 and 27 there is provided a disk of leather or other suitable material 28 for affording frictional surface engagement between the two clutch disks 26 and 27. The disk 27 has affixed thereto an upright shaft 29 which supports the turn-table 20.

Since the potato chips may be weighed and discharged at irregular intervals, an automatic operation requires that the turn-table 20 must be rotated the proper distance to bring the successive empty bags upon the bag-holders 21 into filling position; and this motion must be synchronized with the weighing operation so that no bag B will be moved away from filling position before receiving the full discharge of potato chips intended therefor.

In order to accomplish this automatic synchronization between the weighing operation and the bag-moving operation, I have provided the solenoid 30 which is in the electric circuit 30a with a switch 31, this switch being adapted to be opened automatically by the weight of the balance hopper 5 when the predetermined amount of the potato chips or other commodity has been deposited therein. That is, the circuit through the solenoid 30 is normally closed and is opened momentarily only when the balance hopper 5 contains the predetermined weight of the commodity. The core of the solenoid 30 has pivotally mounted about a horizontal axis upon the lower end thereof a latch pull 32 which is adapted to engage beneath the latch 33 on the detent bar 34 so as to raise the detent pin 35 thereof upwardly out of one of the circular series of recesses 36 in the top clutch disk 27 and thereby permit transmission of driving force from rotating shaft 25a through the clutch 26—27 to the turn-table 20. Such rotation of the disk 27 will, however, move one of the upstanding latch pull trips 37, equi-spaced in an annular series upon the disk 27, into engagement with the pivoted latch pull member 32 so as to remove it from engagement beneath the latch member 33. Upon release of the detent bar 34, its pin 35 will drop into the next recess 36 as such recess comes to position beneath the detent pin 35. Such engagement of the pin 35 in a recess 36 will stop rotation of the disk 27 of the slip clutch, and the turn-table 20 will likewise be stopped, this being arranged to occur when an empty bag B has been moved into position for receiving a discharge of potato chips or the like from the snout 11. As will be observed, the recesses 36 are so positioned as to pass beneath the detent pin 35.

When a trip member 37 engages the latch pull member 32, it will pass therebeneath so as to turn the member 32 about its axis which is co-operatively arranged with respect to the trip 37; with the result that the member 32 comes to rest upon the beveled shoulder 33a of the latch member 33, ready to drop by gravity into position beneath the latch 33 when the solenoid 30 is de-energized in the manner of operation above described.

When the parts are in the position shown in Fig. 7 of the present drawings, an empty bag B has been moved to and is being held in filling position at the snout 11 and will be held there until the contents of the balance hopper 5 have been discharged into the bag. When such contents have been so discharged, the electric circuit 30a to the solenoid 30 is automatically closed and this solenoid, being thereby energized, raises the member 32 which lifts the detent 35 out of its recess 36. Then the turn-table 20 is permitted to be rotated through the clutch 26—27 and, at the same time, solenoid 7 through opening of its switch 6 is de-energized and the shaking hopper 1 is permitted to supply potato chips or some other commodity to the balance hopper 5, since the discharge end of the hopper 1 is now no longer closed by the air-controlled shutter 16.

Rotation of the clutch disk 27 causes a trip pin 37 thereupon to remove the latch pull 32 from beneath the latch 33. The detent arm then falls by gravity onto the clutch disk 27 and the pin 37 will drop into the next recess 36 which comes under the detent pin 37. At the same time the latch pull 32 will be turned upon its pivot by engagement of the pin 37 so as to come to rest upon the beveled nose 33a of the latch 33; and this condition will continue until the breaking of the electric circuit 30a by the completion of the filling of the hopper 5 causes the latch pull 32 to drop into engagement beneath the latch 33 ready to start the same cycle of operations over again.

The spaces between the recesses 36 correspond to the extent of movement of the turn-table 20 required to move the next empty bag B into filling position at the snout 11. Regardless of the length of time that may be required for filling the balance hopper 5, the empty bag after having been positioned at the snout 11, will not be moved from such position until the predetermined weight of the potato chips or other such commodity has been supplied to the hopper 5 and the contents thereof have been discharged by the air-jet into the snout 11 and into the bag which is to receive the same. There is comparatively little time required for the air-jet to effect such emptying of the material from the balance hopper 5 but, as above explained, my device is so constructed and arranged and so timed in its operation that the bag-moving means will not be permitted to operate during the bag-filling operation. Thus the next bag will not be moved into filling position until the preceding bag has been filled with the predetermined weight of the commodity from the hopper 5.

Thus I have devised an apparatus in which the operations of moving a succession of empty bags or other containers into the filling position at the discharge snout 11, weighing a predetermined amount of the potato chips or other commodity for one bag, transfer of the weighed amount of such commodity to the individual bags in succession, the transfer of the filled bags in succession to the point of delivery, and the actual delivery of the filled bags from the bag-holding means, are all performed automatically in synchronized sequence according to a predetermined related order for these several operations, as above explained. As a result, there is obtained comparative speed and dependability in the performance of these operations.

In accomplishing the above automatic operations, it will be observed that there is involved a definite co-ordination between the operation of transferring the weighed units of the material to the successive bags and the operation of moving the empty bags into filling position; and one feature of my present device which makes it possible to operate in such a manner and with such comparative speed and marked dependability, is the provision of air means for discharging the material from the balance hopper 5. The air-jet means is peculiarly well adapted for use in the transfer of potato chips or the like; although it is to be understood that other forms of air means may be employed for this purpose in a device which embodies the construction and arrangement of the other several features as herein set forth.

Other advantages resulting from my present form of device will suggest themselves to those who are familiar with the art to which this invention relates.

What I claim is:

1. In a device of the class described, the combination of a hopper having an inclined bottom and a discharge opening at the lower end thereof, said discharge opening having a closure that is swingingly mounted so as to normally assume open position, a weighing receptacle located in such position as to receive the material discharged from said hopper, air jet means adapted to be actuated for impinging a jet of air against said closure for closing the same so as to thereby discontinue the discharge from said hopper, and electric means adapted for energization by the weight of said weighing receptacle and its contents when the same receives a predetermined weight of the material for automatically actuating said air jet means.

2. In a device of the class described, the combination of a hopper having an inclined bottom and a discharge opening at the lower end thereof, said discharge opening having a closure that is swingingly mounted so as to normally assume open position, a weighing receptacle located in such position as to receive the material discharged from said hopper, unitary air jet means adapted to be actuated for impinging a jet of air against said closure for closing the same so as to thereby discontinue the discharge from said hopper and for simultaneously directing a jet of air within said weighing receptacle so as to expedite the emptying of the material therefrom, and electric means adapted for energization by the weight of said weighing receptacle and its contents when the same receives a predetermined weight of the material for automatically actuating said air jet means.

FRANK S. AVIL.

References Cited in the file of this patent

UNITED STATES PATENTS

| Number | Name | Date |
|---|---|---|
| 584,035 | Chapin | June 8, 1897 |
| 640,626 | Braun | Jan. 2, 1900 |
| 667,560 | Nickerson | Feb. 5, 1901 |
| 935,506 | Heybach | Sept. 28, 1909 |
| 1,309,671 | Weaver | July 15, 1919 |
| 1,336,705 | Leumann | Apr. 13, 1920 |
| 1,729,192 | Smith et al. | Sept. 24, 1929 |
| 2,022,867 | Middleboe et al. | Dec. 3, 1935 |
| 2,033,586 | Noble | Mar. 10, 1936 |
| 2,100,874 | Ryan | Nov. 30, 1937 |
| 2,138,356 | Ryan et al. | Nov. 29, 1938 |
| 2,139,903 | Mason | Dec. 13, 1938 |
| 2,181,756 | Cook | Nov. 28, 1939 |
| 2,273,330 | Robinson | Feb. 17, 1942 |
| 2,303,140 | Sackett | Nov. 24, 1942 |
| 2,466,386 | Curioni | Apr. 5, 1949 |